R. FRITSCHE.
PROCESS OF MAKING ORNAMENTS.
APPLICATION FILED SEPT. 15, 1917. RENEWED DEC. 3, 1918.
1,294,253.
Patented Feb. 11, 1919.
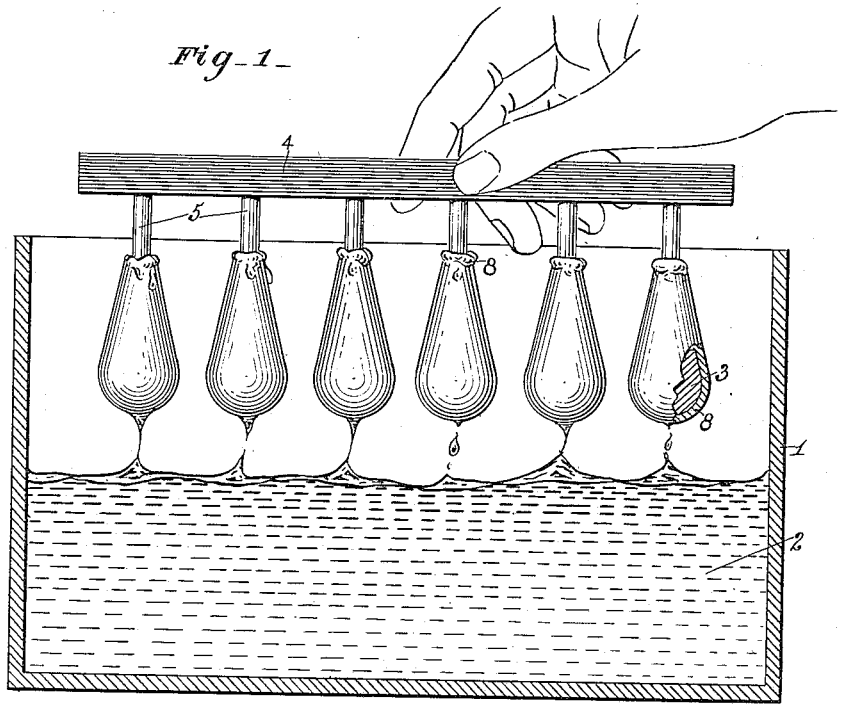
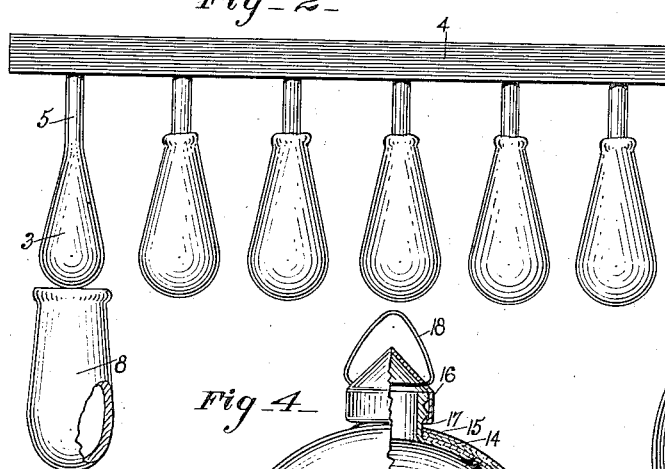
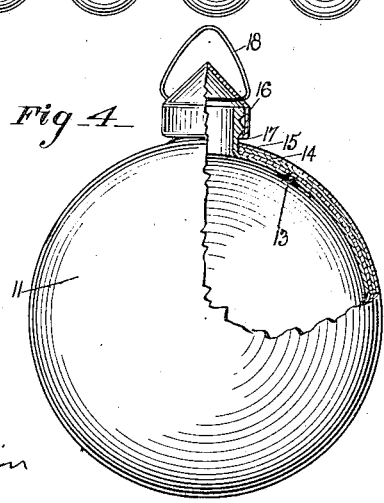
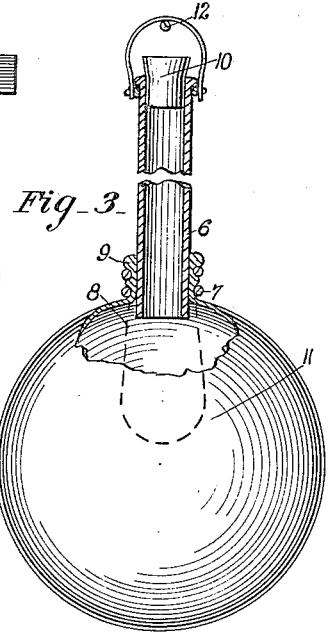
WITNESSES
Frank C. Palmer.
A. L. Kitchin.
INVENTOR
Rudolf Fritsche
BY
ATTORNEYS

UNITED STATES PATENT OFFICE.

RUDOLF FRITSCHE, OF HOBOKEN, NEW JERSEY, ASSIGNOR TO ANTONIA FRITSCHE, OF NEW YORK, N. Y.

PROCESS OF MAKING ORNAMENTS.

1,294,253.      Specification of Letters Patent.      Patented Feb. 11, 1919.

Application filed September 15, 1917, Serial No. 191,598. Renewed December 3, 1918. Serial No. 265,170.

*To all whom it may concern:*

Be it known that I, RUDOLF FRITSCHE, a subject of the Emperor of Austria, and a resident of Hoboken, in the county of Hudson and State of New Jersey, have invented new and Improved Processes of Making Ornaments, of which the following is a full, clear, and exact description.

This invention relates to an improved ornament and the method of manufacturing the same and has for an object the provision of an improved construction and process whereby a substantially non-fragile ornament may be produced for use as a decoration on a Christmas tree, in a room or on clothing.

Another object in view is to provide a hollow structure formed of glue and then provide coloring matter thereon so as to produce the desired appearance.

A further object in view is the utilization of a particular method whereby hollow members may be formed from molten glue and then inflated to the desired size preparatory to coating with coloring matter.

In the accompanying drawing

Figure 1 is a longitudinal vertical section through a tank showing a quantity of glue, together with a number of molds disclosing certain features of the invention;

Fig. 2 is a side view of a set of molds covered with a coating of glue, one coating being removed for illustrating more clearly the inventive idea;

Fig. 3 is a side view of the molded globe partially in section, together with an inflating member shown in section; and Fig. 4 is a side view of a finished article, certain parts being broken away for illustrating the structure and arrangement of the cap and different coatings.

Referring to the accompanying drawing by numeral, 1 indicates a tank adapted to contain a liquid matter 2, which, when cold is solid, but when heated is liquid to a greater or less extent, according to the degree of heat applied. The liquid matter 2 is preferably a good quality of glue such as formed from the hoofs of animals, soft bones and gristle matter. The glue 2 is heated until it is in a liquid state, as, for instance, approximately the consistency of thick molasses, and then a number of molds 3 are dipped therein, said molds being connected in any suitable manner to a bar 4, whereby a number of molds may be simultaneously dipped, as shown in Fig. 1, for securing a coating of the glue. As the glue is in a rather liquid state at this time the molds are moved, as shown in Fig. 1, and then inverted, so that the glue will run down toward the stems 5 of the molds. The molds are held in this inverted position for a short time and then turned over again. This movement of inverting and re-inverting is continued until the glue has solidified to such an extent as to stop moving under the action of gravity. The bar 4 with the entire set of molds 3 is then set aside and a new set of molds dipped. After the glue has been allowed to cool until it is almost the temperature of the atmosphere the molded glue articles are removed, as shown at the left in Fig. 2. The resulting article is a container somewhat of the shape of the mold. This container or bag of glue is tied to a tube 6 by any suitable means, as, for instance, thread 7, and then air is supplied to the tube, either by blowing with the lips or from a storage supply. A sufficient amount of air is supplied to inflate the container 8 from the dotted position shown in Fig. 3 to the full-line position shown in Fig. 3, which is a perfect globe with the exception of the stem 9 connected with the tube 6. After a sufficient quantity of compressed air has been supplied to form the globe the tube 6 is provided with a stopper 10, and then the tube with its globe 11 is supported on a suitable support, as for instance, a nail 12. The globe 11 is then allowed to remain in a suspended position until the parts have completely cooled and the glue solidified completely. This will produce a substantially resilient ball formed of glue and constructed with comparatively thin walls, whereby the globe 11 is comparatively light and substantially non-fragile. After the ball 11 has been completely dried it is removed from the tube 6 and will permanently retain its shape. If desired, the ball can be used in its original state, but preferably it is colored, as may be desired. When coloring the globe 11 a coating 13 of paint of any desired kind, as, for instance, aluminum paint, is placed on the exterior surface and then a layer 14 of coloring matter is placed on top of the paint. Finally a coating 15 of varnish is supplied on top of the coloring matter so that the coloring matter cannot be easily removed. These coatings are preferably supplied by dipping merely by reason of the cheapness of such operation. A cap 16, of glue or any other desired material is then passed over the neck 9, as shown in Fig. 4, and the end 17 bent for producing a retaining flange. If desired, a wire or other desired supporting member 18 could be passed through the cap 16, so that the ball could be supported on a Christmas tree or on any other article desired to receive the device. The finished article as shown in Fig. 4 is intended especially for use as ornaments on Christmas trees, but they may be used as ornaments in any desired place, and if accidentally dropped on the floor they will not break, though by reason of the shape and coloring matter they will give the same appearance as the glass balls now in common use. It is of course understood that the balls may be colored with a single color, striped, or colored in any desired way without departing from the spirit of the invention. Although the balls are intended primarily as Christmas tree ornaments they may be made in different sizes and also different shapes, so as to be used for other purposes, as, for instance, artificial cherries, grapes or other fruit, as ornaments for ladies' hats.

What I claim is:

1. The method of producing ornaments of the character described, comprising dipping of a mold in molten glue, inverting said mold several times until the glue has solidified to a predetermined extent, removing the solidified glue, supplying air under pressure to said solidified glue until said glue has expanded into a substantially globular shape, maintaining said compressed air in said glue until the walls have substantially dried, and then providing an ornamental coating for said glue.

2. The process of forming Christmas tree ornaments consisting in dipping molds in a liquid capable of forming a coating on the mold, and having the characteristic of being expansible when warm and moist and substantially hard and non-fragile when substantially cold and substantially dry, removing said coating after it has partially hardened, inflating said coating with air and then drying said coating with the air remaining therein.

3. The process of forming Christmas tree ornaments from liquid having a characteristic of being expansible when warm and moist, and substantially hard and non-fragile when substantially cool and substantially dry, consisting of dipping molds into said liquid so that the molds will be coated thereby, then moving the molds into the air, inverting and reinverting the molds until the liquid is sufficiently solidified to resist independent movement under the action of gravity, removing said coating after it has partially hardened, inflating said coating and then drying the coating with the inflating material remaining therein.

RUDOLF FRITSCHE.